United States Patent Office 3,420,363
Patented Jan. 7, 1969

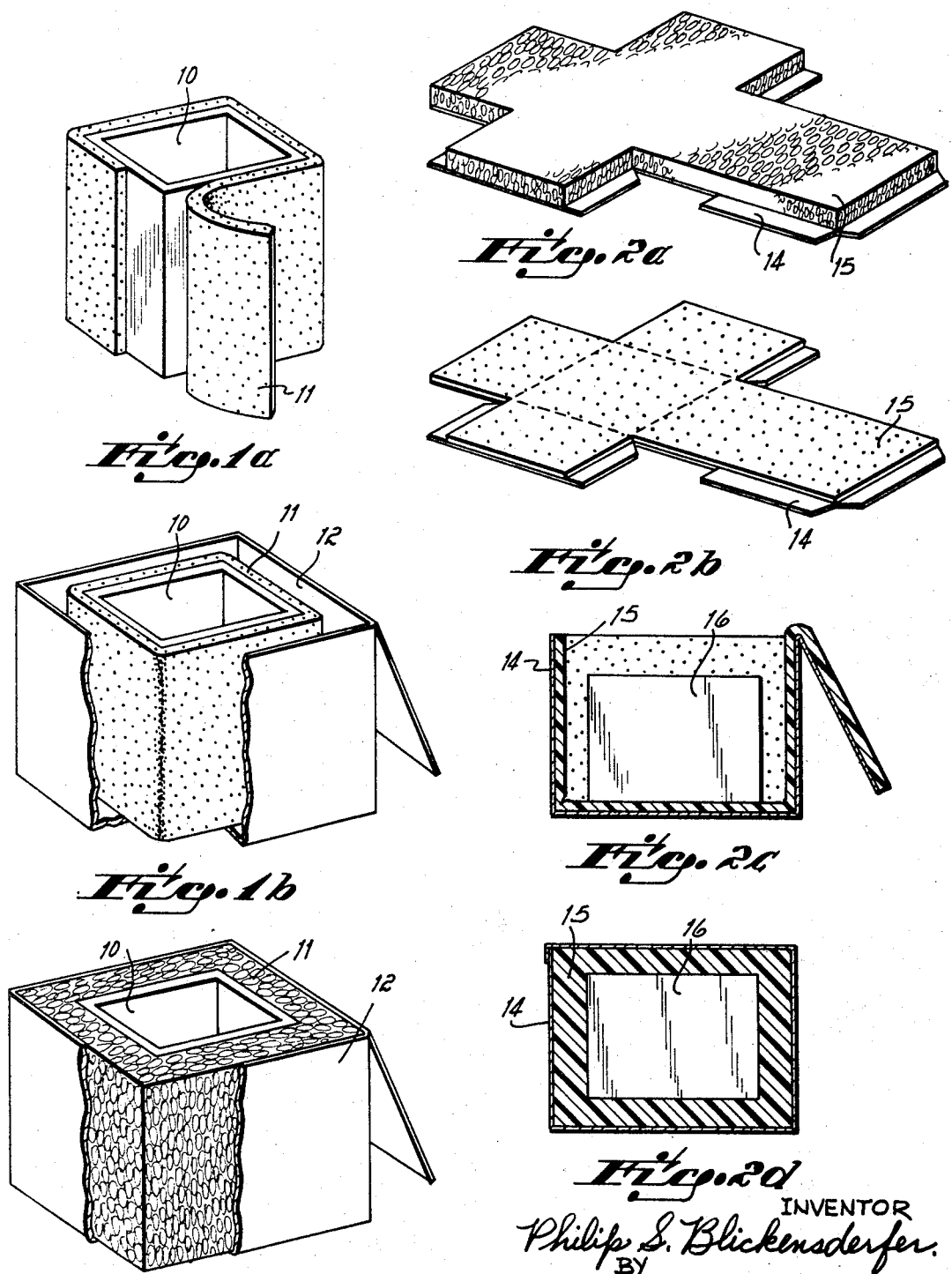

3,420,363
FOAMS DEMONSTRATING THERMAL MEMORY AND PRODUCTS MADE THEREFROM
Philip S. Blickensderfer, Hamilton, Ohio, assignor to U.S. Plywood-Champion Papers Inc., a corporation of New York
Filed Apr. 13, 1966, Ser. No. 542,319
U.S. Cl. 206—46      16 Claims
Int. Cl. B65d *79/00;* B29d *23/00;* C08g *53/08*

ABSTRACT OF THE DISCLOSURE

A foam selected from the group consisting of (a) the reaction product of a liquid butadiene polymer, sulfur monochloride and an activator, and (b) the reaction product of an unsaturated alkyd, a liquid butadiene polymer and sulfur monochloride is reversibly densified by heating to an elevated temperature, applying a compacting force to reduce the volume, and cooling in the densified condition, said densified foam being subsequently heated to an elevated temperature and caused to reexpand. The composition is used to line containers for packaging fragile materials.

---

This invention relates to novel foam products which display a "thermal memory," that is, products which can be converted from their original volume to a generally stable intermediate densified state of reduced volume, and can then be reversibly expanded to a greater volume approximating the original volume. More particularly, the invention relates to a novel method for treating foam products incorporating butadiene liquid polymers and sulfur monochloride to utilize this thermal memory property in packaging and other applications. The invention also relates to packaging materials incorporating expansible foams having a thermal memory.

The invention is predicated on the empirical discovery and determination that foams prepared from certain formulations, described hereinafter, which have a relatively low density (large volume) as produced, can be converted reversibly to a higher density (relatively smaller volume) by compressing or loading them while sufficiently heated, and then cooling the foam in the densified state while under load. After cooling to room temperature the densified foam will remain in the condition of reduced volume (relative to its volume as originally formed) over an indefinite period of time, even under no-load condition. Surprisingly, however, it has been discovered that the foam so treated retains a "memory" of its original larger volume and, by reheating the foam to a memory releasing temperature, it will expand to substantially its original "as formed" volume or to the volume permitted by the container in which the foam is disposed.

This "thermal memory" characteristic, or potential expansibility, is not possessed by the foam as formed; the foam must first be converted to the densified state before the memory attaches to it. The characteristic is not possessed by such foams as rigid polyurethane and polystyrene foams, which for example, will discolor and tend to decompose before a temperature level is reached at which they can be compressed without fracture or crumbling. The flexible polyurethane foams, on the other hand, quickly return to the original volume after being heated, compressed, and cooled, i.e. they cannot be converted to a stable densified intermediate state.

The foams which I have discovered, can be made to display this unique property are products of the interreaction of a system comprising a liquid butadiene polymer having a molecular weight in the range of about 500–10,000, sulfur monochloride ($S_2Cl_2$), and an activator which may be a fatty acid, rosin, water, or a polyhydric alcohol such as glycerin. Several examples of the production of suitable foams from these reactants are disclosed in the copending application of Charles P. West et al. Ser. No. 455,596, filed May 13, 1965, and titled "Novel Foams and Methods for Their Production," to which reference is hereby made.

I have also found that related additional foams which can also be made to display this thermal memory characteristic are provided by products of the reaction of certain alkyds with similar liquid butadiene polymers and sulfur monochloride. Examples of the production of foams from these reactants are disclosed in the copending application of Charles P. West et al., Ser. No. 527,775, filed Feb. 16, 1966, entitled "Production of Foam Products From Tall Oil Alkyds."

It has been the primary objective of this invention to provide products based on such foams wherein the thermal memory characteristic of the foams is used to advantage. It has been a further objective of the invention to provide a method whereby such a foam can be reduced to a fraction of its as formed volume, in which state it can remain over a prolonged period of time, i.e., it is stable, and subsequently can be caused to return substantially to its original volume.

It has been another objective of this invention to provide a packaging method wherein an article to be packaged is placed in a container having a "thermal memory" foam therein, and is then immobilized or confined by causing the foam to expand in situ around the article within the package.

It has been yet another objective of this invention to provide a packaging material having an in situ expansible foam product adhered to a substrate and which can be shipped as an unerected box blank of small volume, and which can then be erected and the foam expanded at the point of use.

The diene polymers which are most useful in the production of such foams are liquid butadiene polymers and include homopolymers of butadiene and copolymers of butadiene with styrene, and mixtures thereof. This component is reacted with sulfur monochloride liquid, in the presence of an activator which may be added separately or which may be premixed with the diene polymer. The activator is selected from the group consisting of rosin, fatty acids, polyhydric alcohols, water, and mixtures thereof. By the term rosin, as used here, is meant a material which consists essentially of various forms of abietic acid, including common wood rosin, gum rosin and tall oil rosins. A fatty acid activator can be used in addition to or in place of the rosin or other components, and may be a synthetic or a natural material containing unsaturated straight and branched chain aliphatic acids having 10 to 22 carbon atoms per molecule such as, for example, oleic and linoleic acids. Glycerin is the preferred polyhydric alcohol activator.

As previously suggested, other foams suitable for use herein are formed by use of an unsaturated alkyl, together with the diene foam and $S_2Cl_2$, as shown more specifically hereinafter.

Optional additional constituents may also be used during formation of the foam, for example, blowing agents such as $NaHCO_3$, $Na_2CO_3$, $CaCO_3$, surfactants, mineral oil, or filters, the inclusion of the additional constituents being dependent upon the physical properties desired in the foam product, the method of production, etc. The foaming reaction is preferably carried out in the presence of a non-reactive organic solvent for the diene polymer such as pentane.

One specific group of foams which can be treated to display the thermal memory characteristic includes foams produced from systems comprising 100 parts by weight of the butadiene liquid polymer, 1 to 15 parts activator and 15 to 50 parts sulfur monochloride. The production of the foam itself is more completely described in previously identified West et al. application, Ser. No. 455,596.

Table I sets forth various foam formulations of this group which have been found to display the thermal memory characteristic when treated in accordance with this invention:

It has been observed that the foaming reaction and resultant foam structure are difficult to control when water alone is used as the activator. Where water is a principal activator it is preferred practice to add to the reaction system an agent to improve control by slowing down such reaction, as by using water in solution with sodium silicate or admixed with another activator (e.g., Table I, Example 6).

In accordance with this invention, a foamed product formed from compositions such as are above set forth, is first heated to an elevated temperature at which the

TABLE I

| Component, wt. | Example No. | | | | | |
| --- | --- | --- | --- | --- | --- | --- |
| | 1 | 2 | 3 | 4 | 5 | 6 |
| Diene polymer | 100 Flosbrene 45VLV.[1] | 100 Flosbrene 45VLV.[1] | 100 Flosbrene 25VLV.[2] | 100 Flosbrene 45VLV.[1] | 100 Flosbrene 45VLV.[1] | 100 Buton 100.[3] |
| Activator | Fatty acid | Fatty acid | Fatty acid, 5 glycerin. | Fatty acid | Fatty acid, 1 glycerin. | {6.7 Trostol.[4] {2.7 rosin.[5] {0.7 Sod-Sil.[9] |
| $S_2Cl_2$ | 42 | 42 | 42 | 42 | 42 | 22. |
| Surfactant | | 2 drops SF 1005[6] | 2 drops SF 1005[6] | 2 drops SF 1005[6] | 2 drops SF 1005[6] | |
| Blowing agent | 10 $NaHCO_3$ | 10 $NaHCO_3$ | 25 $NaHCO_3$ | 10 $NaHCO_3$ | 10 $NaHCO_3$ | 31 $NaHCO_3$. |
| Solvent | 20 pentane | 20 pentane | 20 pentane | 20 pentane | 20 pentane | 26.7 pentane. |
| Other components | 25 ml. mineral oil | 25 ml. mineral oil | | 25 ml. mineral oil | 25 ml. mineral oil, 3 drops T.E.A.[7] | 3.3 P.B.N.A.[8] |
| Foam rigidity | Rigid | | Flexible | | | Flexible. |

[1] "Flosbrene 45VLV" is a liquid, highly 1,4-butadiene-styrene copolymer containing 45% bound styrene, having an average molecular weight of 1,750, and is produced by American Synthetic Rubber Co.
[2] "Flosbrene 25VLV" is a butadiene-styrene copolymer containing 25% bound styrene, and is otherwise similar to Flosbrene 45VLV.
[3] "Buton 100" is a liquid copolymer of butadiene and styrene in 3-4:1 weight ratio comprising 65% 1,2 adduct and 35% 1,4 adduct, having a molecular weight of about 2,000-2,600, an iodine number of about 275-330, and a viscosity of 3,500 poise, and is produced by Enjay Corporation.
[4] Crude tall oil containing about 35-46% rosin, 45-55% fatty acids, and 1.5% water.
[5] Wood rosin.
[6] SF 1005 is a fluid dimethyl silicone produced by General Electric Co.
[7] Triethylamine.
[8] P.B.N.A. is phenyl beta naphthylamine.
[9] "Sod-Sil" is a commercial aqueous sodium silicate solution, 47° B é

Some commercially available emulsion polymerized diene polymers such as the "Flosbrene" used in Examples 1–5 do not require the separate addition of an activator inasmuch as fatty acids are present as components in the polymer as sold, typically in the amount of about 5%.

An illustrative example of the production of a foam incorporating an unsaturated alkyd is as follows:

EXAMPLE NO. 7

A mixture constituted by 100 parts by weight crude tall oil (fatty acid content about 45%, rosin acid content about 40%) and 15.1 parts glycerine was heated to a peak temperature of 450–460° F. for about 4 hrs. until the acid number of the reacting mass became 5–10. After cooling this material, 7.4 parts of maleic anhydride were added, and the system was cooked for about 8 hrs. at a peak temperature of 500° F., until an alkyd having a Gardner viscosity of $Z_6$–$Z_7$ was produced.

The alkyd was prebodied by incomplete reaction with $S_2Cl_2$ to increase its molecular weight. Foam was then produced by reaction of a formulation having the composition:

| | Parts wt. |
| --- | --- |
| Alkyd (prebodied with 2.0 parts $S_2Cl_2$) | 100.0 |
| Buton 100 [1] | 100.0 |
| DC 232 [2] | 1.3 |
| Pentane | 40.0 |
| $S_2Cl_2$ | 78.8 |

[1] "Buton 100" is a liquid copolymer of butadiene and styrene in 3-4:1 weight ratio comprising 65% 1,2 adduct and 35% 1,4 adduct, having a molecular weight of about 2,000-2,600, an iodine number of about 275-330, and a viscosity of 3,500 poise, and is produced by Enjay Corporation.
[2] "DC 232" is a dimethyl polysiloxane surfactant produced by Dow Corning.

The resulting foam was rigid and had a density of 3.6 lbs./ft.³. Further specific details of the production of foams by the reaction of an alkyd, a liquid diene polymer and sulfur monochloride in weight ratios of 100/5–110/10–150 respectively are taught in the previously identified West et al. application, filed Feb. 15, 1966, such foams in general being suitable for use in carrying out the present invention.

foam attains an increased flexibility so that it can be compressed more easily and without fracturing. While so heated, pressure is applied or the foam is confined at a smaller volume. The compressed foam is then cooled, for example to ambient conditions, while being retained in the confined state. When the foam has cooled it will remain in a relatively densified state, even after the pressure has been released. In this form it can be transported, laminated onto paper board or another substrate, and otherwise worked and handled. When subsequently heated to a memory release temperature, it will substantially revert to its original expanded condition.

More specifically, the temperature employed in the initial heating step should generally be in the approximate range of 150–300° F. Usually there is no advantage in greatly exceeding this temperature range. Temperatures in excess of the decomposition temperature of the foam are, of course, undesirable. Although the particular temperature employed will vary with the foam composition being used, it has been found that temperatures of about 200–230° F. are usually sufficient.

The heated foam is then compressed while maintained at the elevated temperature temperature. Compression may be effected by pressing, rolling, ironing, extruding, or other means for applying densifying pressure on the foam until it has been cooled sufficiently to retain the densified state. The pressure applying means may be heated internally or externally to maintain the foam in a state of increased flexibility until it achieves the desired dimensions. These foams can generally be compressed down to as little as 20–25% of their original volume, although the actual degree of densification can vary with desired use.

While the compression step may consist merely of the application of pressure to the foam, the foam may also be compressed into a desired shape as determined by the configuration of the mold, platen or other means employed to apply the pressure.

When the foam has been compressed to appropriate thickness or volume it is cooled, for example to ambient conditions or to an elevated temperature sufficiently below the initial heating point that the foam will remain stably in the densified state under no-load conditions. Cooling is preferably accomplished gradually in air but may be accelerated by application of a coolant, or otherwise. The foam should preferably be kept under pressure during the cooling step, but need not be cooled below room temperature to retain the densified condition. It is from this reacted, densified condition that the foam displays the thermal memory properties, i.e. the latent ability to re-expand upon reheating.

While in this densified state, the foam can be subjected to various treatments or put to numerous uses. It can be transported, physically worked, shaped, granulated, mixed and in general, treated by techniques employed with fully expanded foams. For example, the foam may be laminated or adhered to various substrates such as paper, bristol board, corrugated board, plastic or metal foil sheets, or to rigid structural panels of metal, glass, wood or plastic. It should also be noted that the foam can be foamed in place on many substrates (e.g. paper, wood, aluminum and many plastics) to which it adheres during foaming. The foam can be shaped by cutting, punching, rolling or like operations to produce desired shapes. The compressed foam can be placed in relatively large spaces or apertures to be subsequently expanded in place.

The densified foam can be reexpanded by reheating it to approximately the original flexibilizing temperature. Again, temperatures on the order of about 150–300° F. are generally sufficient. The thermal memory characteristic of the foam causes it to reexpand in this stage of the process. If maximum expansion of the foam is desired, it can be heated at atmospheric pressure in the absence of physical restraint. In many applications, however, the foam will be partially or fully expanded to a preselected volume or shape by confining it in a suitable mold or enclosure, or by applying a predetermined pressure thereto during the reexpansion.

Examples of the thermal memory characteristics of foams having the compositions of Examples 1, 3 and 6 as set forth in Table I are shown in Table II. Thermal memory was tested by placing one-inch cubes of the various foams in an oven at 250° F. and compressing them to 25% of their original volume. The compression was carried out by placing each cube between two plates having ¼ inch spacers therebetween, with sufficient weight on the top plate to bring it ultimately into contact with the spacers. The temperature was held at 250° F. for one-half hour, during which the cubes remained between the plates. After the one-half hour period, the cubes were removed from the oven, permitted to return to ambient (room temperature e.g. in the range from 65° F.–75° F.) conditions while remaining between the plates, and then removed from between the plates. After twenty-four hours the cubes were reheated to 250° F. to activate their thermal memory and return them to substantially their original height.

TABLE II

| Item | Example Number | | |
|---|---|---|---|
| | 1 | 2 | 3 |
| Softening temp., °F | 200 | 200 | 200 |
| Height before compressing, in | 1 | 1 | 1 |
| Compressing temp., °F | 250 | 250 | 250 |
| Height 1 hr. after removal, in | ¼ | ⁵⁄₁₆ | ⁵⁄₁₆ |
| Height 2 hrs. after removal, in | ¼ | ⅜ | ⅜ |
| Height 4 hrs. after removal, in | ¼ | ⅜ | ⅜ |
| Height 24 hrs. after removal, in | ¼ | ⅜ | ⅜ |
| Reheat temp., °F | 250 | 250 | 250 |
| Thermal memory height, in | ⅞ | ⅝ | ⅞ |

The example numbers in Table II correspond to the foam formulation example numbers in Table I. As can be seen, the flexible foams, i.e. Examples 3 and 6, tend to have a slight rebound after being initially compressed. However, upon application of heat to densified materials made from both the rigid and flexible starting materials, there is a very marked increase in foam volume, closely approaching the original volume.

As can be seen from the foregoing, practice of the invention is not limited to foams which initially are rigid at room temperature, but surprisingly is effectively practiced on foams which are flexible (i.e., which can be compressed without fracturing) as originally reacted. Flexible foams can be envisioned as having a rigid component which apparently is flexibilized upon heating, and which, it is theorized, sets upon cooling in the densified condition.

The thermal memory of the alkyd-$S_2Cl_2$-diene polymer foam of Example 7 was demonstrated by placing samples of the foam in an oven at 200° F. under a compressive load of 7 lbs./in.$^2$, then cooled to room temperature. Behavior at various softening times and memory release temperatures of these samples was as follows:

| | Softening Time, 200° F., Minutes | Compression, Percent Original Height | Rm. Temp. Recovery Time | Rm. Temp. Recovery | 200° F. Rec. Time, Minutes | 200° F., Percent Rec. |
|---|---|---|---|---|---|---|
| a | 5 | 43 | 30 min | 0 | <5 | 100 |
| b | 15 | 68 | 30 min | 0 | 5 | 100 |
| c | 15 | 68 | 3 hours | 0 | ¹ 45 | 40 |
| d | 15 | 68 | 72 hours | 0 | 5 | 100 |

¹ 150° F.

Foams displaying thermal memory properties are, from observation, of predominantly open celled structure. That is, more than fifty percent of the cells or pores communicate with outer surfaces of a foamed body by connecting passageways which may also communicate with other cells. The majority of cells of closed cell structures by contrast do not communicate with outer surfaces.

Other objectives, advantages and features will become apparent by reference to the accompanying drawings, in which:

FIGS. 1a, 1b, and 1c schematically illustrate in sequence the production and assembly of a container which incorporates an expandable-foam covered inner liner in accordance with the invention; and FIGS. 2a, 2b, 2c, and 2d schematically illustrate the manufacture and use of a different form of container which includes a lamina comprising a thermal memory foam produced in accordance with this invention, showing in sequence the expansion of the foam in situ to enclose and secure an article within the container.

Use of the method and products of the invention in packaging articles is illustrated according to one embodiment in FIGURES 1a, b, and c of the drawings. As shown in FIGURE 1a, an internal liner 10 is wrapped in a sheet 11 of foam in the densified state. The foam of sheet 11 may be formed according to Example 1, heated to 250° F. and then compressed to approximately 25% of its original volume. As shown in FIGURE 1b, liner 10 is enveloped or wrapped in the foam sheet 11 and is placed in an outer container 12. The entire container is then heated to 250° F. thereby causing the foam to reexpand under the effect of its thermal memory, as previously described. As shown in FIGURE 1c, expansion of the foam sheet 11 causes it to fill the entire free volume between outer container 12 and liner 10, thereby providing a snug yet shock absorbing foam cushion for an article which can then be slipped into liner 10.

Rather than wrapping the container liner 10 with a sheet of foam which is then expanded, the article to be packaged can itself be wrapped in a sheet of the densified foam, inserted in an enclosing carton, and the foam expanded to immobilize and cushion the article in direct contact with it.

A further embodiment of this invention as adapted for packaging use is shown in FIGURES 2a–d. A box blank 14, which may be of paper, cardboard, bristol board, corrugated board, plastic, or the like, has a blank 15 of the foam as produced (i.e. uncompressed) adhered to it by a suitable adhesive such as an epoxy resin adhesive. The assemblage of blank 14 and foam 15 is heated to a temperature of 230° F. and the foam is compressed to approximately 20% of its original volume. The foam-substrate combination, with the foam in its densified state, is shown in FIGURE 2b. As shown in FIGURE 2c, the composite box blank of substrate 14 and foam 15 is assembled into a box and an article 16 (which may be wrapped in polyethylene film) is inserted therein. As shown in FIGURE 2d, when heat is applied to the box the foam liner is expanded, causing it to envelop the article 16. The article 16 is now protected for shipment.

FIGURES 1a, b, and c schematically illustrate the use of a flexible foam in connection with a packaging procedure. Where a rigid foam 11 is used, it is to be understood that such foam would ordinarily not be wrapped around the liner 10, but instead would probably be foamed in situ on the outside of the liner. Also, the use of a rigid foam would preferably require cutting of the foam where the corners of the liner would occur, whereby folding can be conducted without fracture of the foam; in the case of cut lines along the corner of the liner foam, the embodiment of FIGURE 1c may have a notched out structure at the corners although the liner 10 would still be securely held by reason of the engagement between the liner walls and that of the outer container blank.

In FIG. 2b it is preferred to cut or score along the dotted lines indicated there to enhance the folding qualities of the proposed container.

In further embodiment of this invention, a sheet of the foam may be "crumbed," i.e. comminuted into relatively small pieces, or cut in strips, cubes or other small shapes, either before or after densification. When densified, crumbed foam particles can be poured or fitted into spaces between an article of irregular configuration and an outer shipping container and can be sifted down between the container and the article. Upon reexpansion the particles provide a good cushion over the surface of the article.

As indicated earlier, one of the primary advantages of this invention is to enable the volume of foam products to be reduced, thereby facilitating transportation. The foam can be densified at the manufacturing plant and expanded to a greater volume at the point of use, effecting a saving in cost due to the smaller volume shipped.

Foams exhibiting a thermal memory are those selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride and in one embodiment as to group (a) may be the product of the interreaction of 100 parts of liquid butadiene-styrene copolymer having a molecular weight of about 1000–2000, with 40–50 parts sulfur monochloride and 1–5 parts fatty acids, in the presence of a blowing agent and a solvent for said copolymer.

While there have been shown and described the fundamental novel features of the invention as applied to the preferred embodiments, it will be understood that various changes in details of the formulae and method described can be made by those skilled in the art without departing from the spirit of the invention.

What I desire to claim and protect by Letters Patent is:

1. A method of reversibly densifying a foam selected from a group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride, said method comprising, heating said foam to an elevated temperature at which the foam can be compressed more easily than at room temperature and without fracture, said temperature being insufficient to cause decomposition of said foam, and applying a compacting force to densify said foam by reducing it to a volume substantially smaller than its original volume, cooling the foam in the densified condition, said foam thereafter being capable of substantially retaining said densified condition at room temperature upon release of the compacting force, subsequently heating said densified foam from the cooled condition to a release temperature at which said foam will expand to a larger volume approaching its original volume, and permitting said foam to expand while so heated.

2. The method of claim 1 wherein said foam is heated to a temperature of about 150–300° F. during said densification.

3. The method of claim 2 wherein said foam is compacted to a volume not less than about 20% of its volume prior to densification and said compacting force is maintained during said cooling step.

4. The method of claim 3 wherein said foam is heated to a temperature of about 150–300° F. during said expansion.

5. The method of claim 1 wherein said foam is the product of the interreaction of 100 parts of a liquid butadiene-styrene copolymer having a molecular weight of about 1000–2000, with 40–50 parts sulfur monochloride and 1–5 parts fatty acids, in the presence of a blowing agent and a solvent for said copolymer.

6. The method of claim 1 wherein said foam is an open celled foam.

7. As an article of manufacture, a reacted but expandable foam displaying a thermal memory, said foam being selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride, said foam after formation thereof having been densified by compaction at a temperature of 150–300° F. to a volume substantially smaller than its volume as originally formed and then cooled in a densified state, said foam in the densified state having the characteristic of being expandable to a larger volume by heating to a temperature in the range of 150–300° F.

8. The article of claim 7 wherein said foam is adhered to a substrate of bendable sheet material.

9. The article of claim 7 wherein said foam is adhered to a substrate which is a cellulosic bendable sheet material in the form of a box blank.

10. The article of claim 7 wherein said foam is in particulate form.

11. The article of claim 7 wherein said foam is the product of the interreaction of 100 parts of a liquid butadiene-styrene copolymer having a molecular weight of about 1000–2000, with 40–50 parts sulfur monochloride and 1–5 parts fatty acids in the presence of a blowing agent and a solvent for said copolymer.

12. The article of claim 7 wherein said foam is an open-cell foam.

13. A package comprising a carton formed of bendable sheet material,
an article disposed interiorly within said carton, and a foam expanded in situ between said article and carton,
said foam being selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fattty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride,
said foam after formation thereof having been heated to a temperature of about 150–300° F. at which said foam is of increased flexibility, and densified by compaction to a volume substantially smaller than its volume as originally formed,
said foam having been expanded without significant further reaction thereof in contact with said article in said carton by heating said foam to a release temperature in the range of about 150–300° F.

14. A packaging method which comprises,
introducing into a container a thermal memory foam, said foam being selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride,
said foam after formation thereof having been densified by compaction at a temperature of 150–300° F. to a volume substantially smaller than its volume as originally formed,
placing an article for shipment inside said container in contact with said foam,
and expanding said foam in contact with said article by heating said foam to about 150–300° F. thereby cushioning said article within said container.

15. A packaging method which comprises,
surrounding an article to be packaged with a foam selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride,
said foam after formation thereof having been densified by compaction at a temperature of 150–300° F. to a volume substantially smaller than its volume as originally formed,
and expanding said foam in contact with said article by heating said foam to about 150–300° F.

16. A method of packaging an article in a container which comprises,
placing said article in said container,
interposing a thermal memory foam between said container and said article,
said foam being selected from the group consisting of (a) the foamed products of the reaction of 100 parts by weight of a liquid polymer of butadiene having a molecular weight in the range of about 500–10,000 with about 15 to 50 parts of sulfur monochloride and 1 to 15 parts of an activator selected from the class consisting of fatty acids, rosin, water, and polyhydric alcohols, and (b) the foamed products of the reaction of 100 parts by weight of an unsaturated alkyd with about 5–110 parts of said liquid polymer and about 10 to 150 parts by weight of sulfur monochloride,
said foam after formation thereof having been densified by compaction at a temperature of 150–300° F. to a volume substantially smaller than its volume as originally formed,
and expanding said foam in situ by heating said foam to about 150–300° F., thereby cushioning said article within said container.

References Cited

UNITED STATES PATENTS

| | | | |
|---|---|---|---|
| 1,978,839 | 10/1934 | Gary | 260—777 |
| 2,234,545 | 3/1941 | Auer | 260—23.7 |
| 2,888,417 | 5/1959 | Crouch | 260—22 |
| 3,201,911 | 8/1965 | Woodland | 206—46 |
| 3,238,599 | 3/1966 | Bauman | 206—46 |
| 3,260,688 | 7/1966 | Watanabe et al. | 260—22 |
| 3,284,275 | 11/1966 | Nelson | 264—321 |

SAMUEL H. BLECH, *Primary Examiner.*

W. J. BRIGGS, JR., *Assistant Examiner.*

U.S. Cl. X.R.

220—9; 229—14; 260—2.5, 22, 23.7, 27; 264—45, 230, 321